United States Patent
Patel et al.

(10) Patent No.: US 10,705,313 B2
(45) Date of Patent: Jul. 7, 2020

(54) OPTICAL FIBER COUPLING USING MULTIPLE CYLINDRICAL LENSES

(71) Applicant: Cisco Technology, Inc., San Jose, CA (US)

(72) Inventors: Vipulkumar Patel, Breinigsville, PA (US); Sean P. Anderson, Macungie, PA (US); Weizhuo Li, Berkeley Heights, NJ (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 15/904,038

(22) Filed: Feb. 23, 2018

(65) Prior Publication Data
US 2019/0265437 A1 Aug. 29, 2019

(51) Int. Cl.
*G02B 9/04* (2006.01)
*G02B 6/26* (2006.01)
*G02B 6/10* (2006.01)

(52) U.S. Cl.
CPC ............... *G02B 9/04* (2013.01); *G02B 6/10* (2013.01); *G02B 6/26* (2013.01)

(58) Field of Classification Search
CPC ........................................................ G02B 9/04

USPC ......................................................... 359/793
See application file for complete search history.

(56) References Cited

U.S. PATENT DOCUMENTS

| 9,411,105 B2 | 8/2016 | Anderson et al. | |
| 2012/0224146 A1* | 9/2012 | Katou | G03B 33/06 353/20 |

OTHER PUBLICATIONS

Maeda et al., "Hybrid laser-to-fiber coupler with a cylindrical lens," [Abstract Only] [Accessed Online Feb. 26, 2018] [https://www.ncbi.nlm.nih.gov/pubmed/20168842].

* cited by examiner

*Primary Examiner* — James C. Jones
(74) *Attorney, Agent, or Firm* — Patterson + Sheridan, LLP

(57) ABSTRACT

A system and related method and assembly are disclosed. The system comprises one or more optical fibers configured to propagate one or more optical signals. The system further comprises at least a first cylindrical lens element fixedly connected with the one or more optical fibers and configured to expand the one or more optical signals along a predefined dimension. The system further comprises at least a second cylindrical lens element optically coupled with the first cylindrical lens element and configured to condense the expanded one or more optical signals along the predefined dimension.

20 Claims, 5 Drawing Sheets

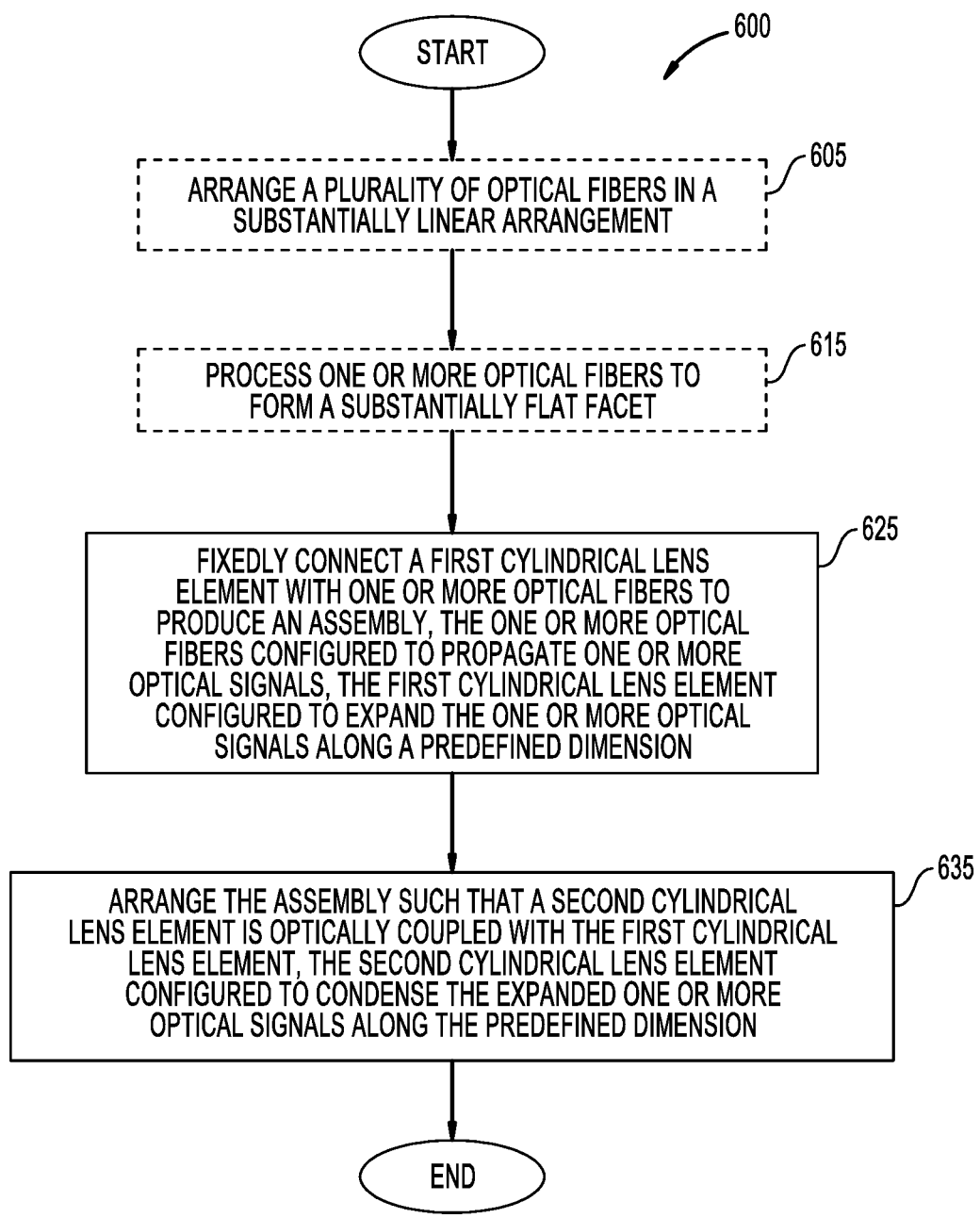

OPTICAL FIBER COUPLING USING MULTIPLE CYLINDRICAL LENSES

TECHNICAL FIELD

Embodiments presented in this disclosure generally relate to techniques for optical coupling of photonic components with optical fibers using multiple cylindrical lenses.

BACKGROUND

During the manufacturing of optical assemblies, the process of optically coupling a photonic component with one or more optical fibers can be a primary factor influencing cost and yield. By using an array-based approach, multiple optical fibers can be attached simultaneously with the photonic component (instead of sequentially), which improves yield and throughput while reducing overall assembly cost.

A lens or lens array is often used to achieve a suitable optical coupling efficiency between the one or more optical fibers and the photonic component. The lens or lens array is typically a custom piece-part that is implemented as a discrete component or is affixed to a facet of the optical fiber or fiber array. However, the lens or lens array typically requires a precision alignment to be performed along multiple axes to achieve the suitable optical coupling efficiency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is an exemplary method of optically coupling with one or more optical fibers using a plurality of cylindrical lenses, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
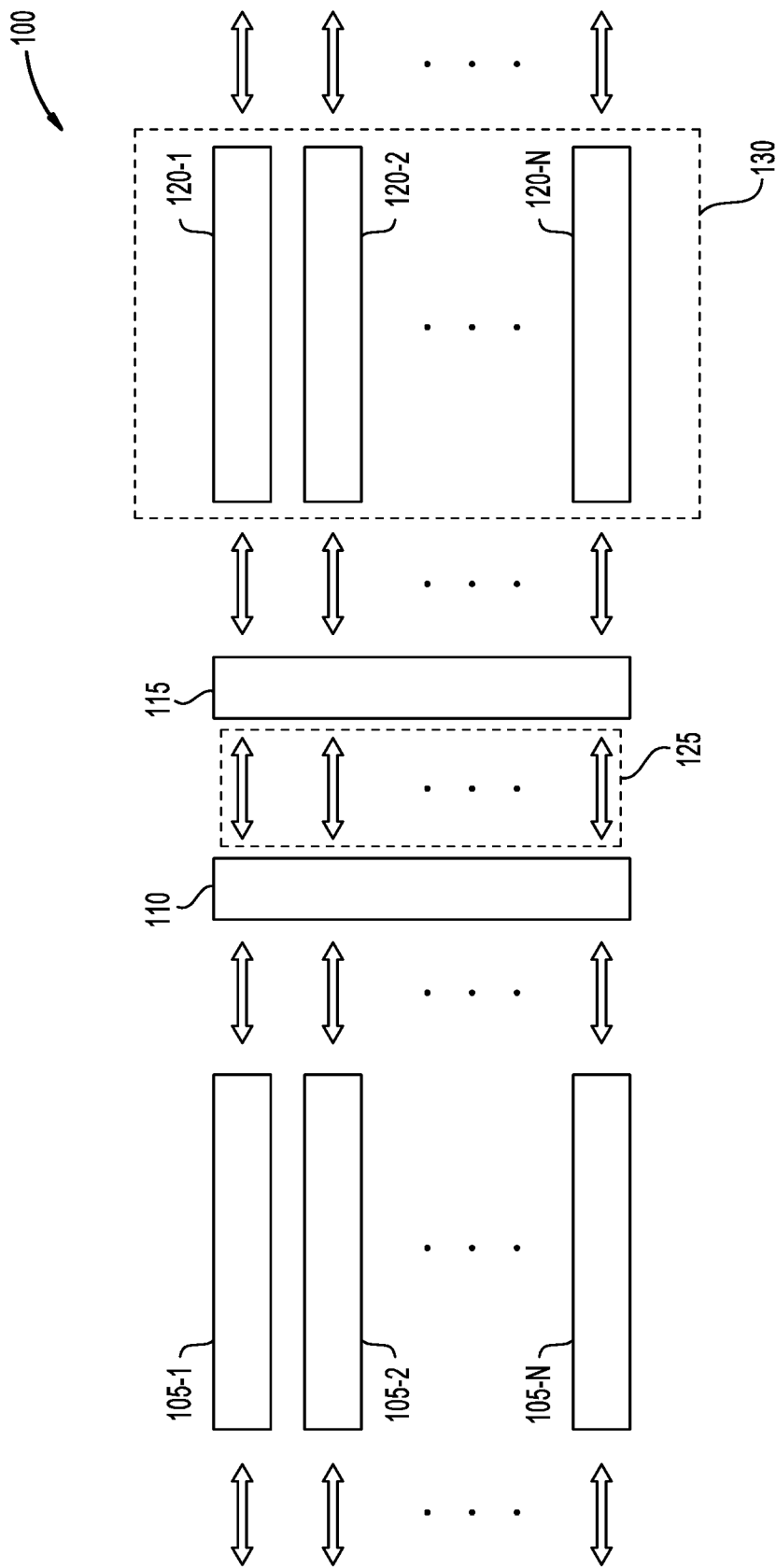
FIG. 1 is a block diagram of an exemplary system having a plurality of cylindrical lenses, according to one or more embodiments.

One embodiment presented in this disclosure is a system comprising one or more optical fibers configured to propagate one or more optical signals, at least a first cylindrical lens element fixedly connected with the one or more optical fibers and configured to expand the one or more optical signals along a predefined dimension, and at least a second cylindrical lens element optically coupled with the first cylindrical lens element and configured to condense the expanded one or more optical signals along the predefined dimension.

Another embodiment presented in this disclosure is a method comprising fixedly connecting at least a first cylindrical lens element with one or more optical fibers to produce an assembly. The one or more optical fibers are configured to propagate one or more optical signals. The first cylindrical lens element is configured to expand the one or more optical signals along a predefined dimension. The method further comprises arranging the assembly such that at least a second cylindrical lens element is optically coupled with the first cylindrical lens element, wherein the second cylindrical lens element is configured to condense the expanded one or more optical signals along the predefined dimension.

Another embodiment presented in this disclosure is an assembly comprising one or more optical fibers configured to propagate one or more optical signals; and at least one cylindrical lens element fixedly connected with the one or more optical fibers and configured to expand the one or more optical signals along a predefined dimension.

Example Embodiments

According to various embodiments disclosed herein, a system comprises one or more optical fibers configured to propagate one or more optical signals, at least a first cylindrical lens element fixedly connected with the one or more optical fibers and configured to expand the one or more optical signals along a predefined dimension. The system further comprises at least a second cylindrical lens optically coupled with the first cylindrical lens and configured to condense the expanded one or more optical signals along the predefined dimension. In some embodiments, the first cylindrical lens comprises one of an optical fiber stub, a D-shaped fiber stub, and a plastic lens. In some embodiments, the second cylindrical lens is formed in a facet of a substrate, and one or more optical waveguides are formed in the substrate and are configured to receive the condensed one or more optical signals.

Beneficially, the use of multiple cylindrical lenses provides a low-cost, high-yield method of optically coupling an array of optical fibers to a photonic component. The system generally does not require a separate lens array to be designed and attached. Further, the system can use existing high-precision manufacturing processes and methods for forming the multiple cylindrical lenses, such as single-mode optical fibers and lithographically-defined etching. The system is capable of achieving an alignment tolerance that may be suitable for enabling passive optical alignment, further reducing manufacturing costs.

FIG. 1 is a block diagram of an exemplary system 100 having a plurality of cylindrical lenses, according to one or more embodiments. The system 100 comprises a plurality of first optical conduits 105-1, 105-2, . . . , 105-N that are configured to propagate a plurality of optical signals. In some embodiments, the plurality of first optical conduits 105-1, 105-2, . . . , 105-N are implemented as a plurality of optical fibers, such as single-mode optical fibers. In some embodiments, the plurality of optical fibers are arranged in an array (i.e., the individual optical fibers are fixedly connected with each other and have a predefined positioning relative to each other). However, in an alternate implementation, the plurality of first optical conduits 105-1, 105-2, . . . , 105-N may be implemented as optical waveguides that are formed within a substrate.

The system 100 further comprises at least a first cylindrical lens element 110 configured to receive the plurality of optical signals exiting the plurality of first optical conduits 105-1, 105-2, . . . , 105-N. The first cylindrical lens element 110 is further configured to expand the plurality of optical signals along a predefined dimension (or axis). As will be discussed in greater detail below, in some embodiments, the first cylindrical lens element 110 may be fixedly connected with the plurality of first optical conduits 105-1, 105-2, . . . , 105-N.

In some embodiments, the first cylindrical lens element 110 represents a single cylindrical lens element that receives and expands the plurality of optical signals. In other embodiments, the first cylindrical lens element 110 represents a plurality of cylindrical lens elements that are configured to receive the plurality of optical signals. For example, each cylindrical lens element may correspond to a respective optical signal (or to a respective first optical conduit) in a 1:1 ratio.

For an optical signal incident thereupon, the first cylindrical lens element 110 is configured to expand the optical signal from substantially a point source to substantially a line source. More specifically, the first cylindrical lens element 110 comprises a substantially cylindrical surface through which the light from the incident optical signal is oriented substantially along a single dimension or axis. As discussed herein, the substantially cylindrical surface of the first cylindrical lens element 110 may have any suitable curvilinear contour (e.g., a circular contour, an elliptical contour, an irregular contour) that is capable of suitably expanding the plurality of optical signals along the predefined dimension.

Thus, in some embodiments a plurality of expanded optical signals 125 exits the substantially cylindrical surface of the first cylindrical lens element 110. Each of the plurality of expanded optical signals 125 has its light oriented substantially along a single dimension or axis.

The system 100 further comprises at least a second cylindrical lens element 115 that is optically coupled with the first cylindrical lens element 110. The plurality of expanded optical signals 125 are incident upon a substantially cylindrical surface of the second cylindrical lens element 115. The second cylindrical lens element 115 is configured to condense the expanded optical signals 125 along the predefined dimension.

For an optical signal incident thereupon, the second cylindrical lens element 115 is configured to condense the expanded optical signal from substantially a line source to substantially a point source. More specifically, the second cylindrical lens element 115 comprises a substantially cylindrical surface upon which the light from the expanded optical signal is incident. As discussed herein, the substantially cylindrical surface of the second cylindrical lens element 115 may have any suitable curvilinear contour (e.g., a circular contour, an elliptical contour, an irregular contour) that is capable of suitably condensing the plurality of optical signals along the predefined dimension.

After being condensed by the second cylindrical lens element 115, the condensed optical signals may be received by a plurality of second optical conduits 120-1, 120-2, . . . , 120-N that are optically coupled with the second cylindrical lens element 115. In some embodiments, the plurality of second optical conduits 120-1, 120-2, . . . , 120-N are implemented as a plurality of optical waveguides that are formed within a substrate 130. In some embodiments, the substrate 130 may be included within a photonic component.

The relative arrangement of the second cylindrical lens element 115 and the plurality of second optical conduits 120-1, 120-2, . . . , 120-N may be provided through any suitable means. In some embodiments, the second cylindrical lens element 115 is etched into a facet of the substrate 130. In other embodiments, the second cylindrical lens element 115 is a separate component that is fixedly connected with the substrate 130 or with the plurality of second optical conduits 120-1, 120-2, . . . , 120-N.

While the plurality of second optical conduits 120-1, 120-2, . . . , 120-N have been described as a plurality of optical waveguides, in an alternate implementation, the plurality of second optical conduits 120-1, 120-2, . . . , 120-N may be implemented as a plurality of optical fibers.

In some embodiments, the first cylindrical lens element 110 and the second cylindrical lens element 115 are arranged substantially orthogonally, such that the first cylindrical lens element 110 extends along a first axis and the second cylindrical lens element 115 extends along a second axis that is substantially orthogonal to the first axis. In some embodiments, the substantially cylindrical surfaces of the first cylindrical lens element 110 and the second cylindrical lens element 115 are arranged substantially orthogonal to each other. As used herein, "substantially orthogonal" is intended to encompass an orthogonal arrangement, as well as non-orthogonal arrangements that provide a suitable optical coupling between the first cylindrical lens element 110 and the second cylindrical lens element 115.

Beneficially, by dividing the focusing power between the first cylindrical lens element 110 and the second cylindrical lens element 115, the alignment tolerance of the system 100 is improved. The improved alignment tolerance may eliminate the need for a separate lens array and may further permit passive optical alignment techniques, both of which reduce manufacturing costs.

As shown, the system 100 maintains a plurality of N optical channels between the plurality of first optical conduits 105-1, 105-2, . . . , 105-N and the plurality of second optical conduits 120-1, 120-2, . . . , 120-N. In some implementations, the system 100 may be configured to support bidirectional communication of optical signals. However, in other implementations the system 100 may be configured to support only unidirectional communication.

Figure 2:
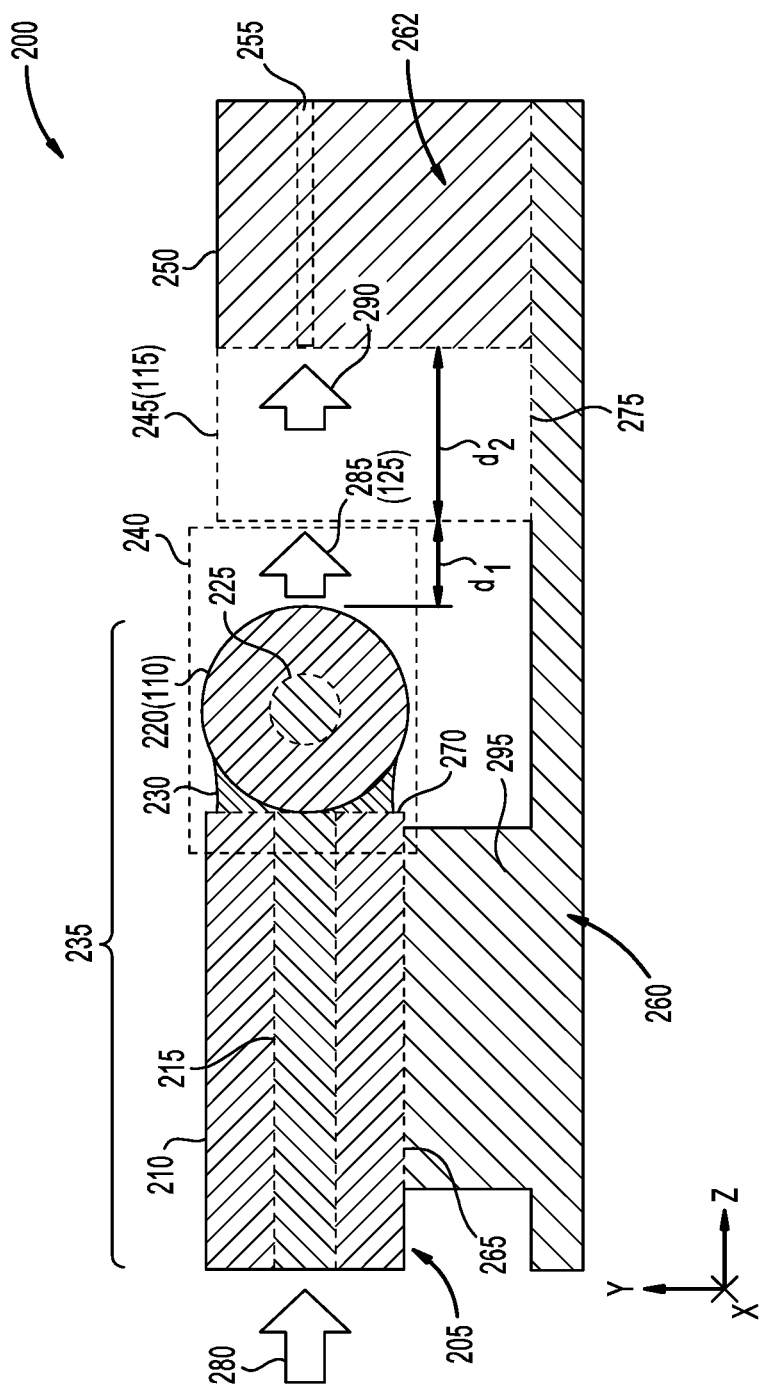
FIG. 2 is a diagram illustrating an exemplary optical coupling using an optical fiber stub as a cylindrical lens, according to one or more embodiments.

FIG. 2 is a diagram 200 illustrating an exemplary optical coupling using an optical fiber stub as a cylindrical lens, according to one or more embodiments. More specifically, the diagram 200 illustrates an optical coupling of an assembly 235 with a photonic component 250. The diagram 200 represents one possible implementation of the system 100 of FIG. 1.

The assembly 235 comprises an optical fiber 205 fixedly connected with an optical fiber stub 220. The optical fiber 205 may be a single-mode optical fiber. As known to a person of ordinary skill in the art, the optical fiber 205 comprises a core 215 configured to propagate an optical signal 280, and a cladding 210 that surrounds the core 215.

The optical fiber stub 220 represents one example of the first cylindrical lens 110. In some embodiments, the optical fiber stub 220 may be formed from a single-mode optical fiber. As shown, the optical fiber 205 is elongated (i.e., the core 215 extends) along the Z-dimension, and the optical fiber stub 220 is substantially perpendicular to the optical fiber 205, as a core 225 of the optical fiber stub 220 extends along the X-dimension. An expanded optical signal 285 exits the optical fiber stub 220.

As shown in the section 240, the optical fiber stub 220 may be fixedly connected at a facet 270 of the optical fiber 205. The facet 270 may be a substantially optically flat facet. In some embodiments, the optical fiber 205 may be processed (e.g., polished) to form the facet 270. In some embodiments, the optical fiber 205 may be included in an array with one or more other optical fibers, and the processing may be performed on the array. An adhesive 230, such as an index-matching epoxy, may be applied between the optical fiber stub 220 and the optical fiber 205. Alternate implementations of the section 240 are described below with respect to FIGS. 3 and 4.

Beneficially, the optical fiber stub 220 provides a low-cost implementation of the first cylindrical lens 110 and offers a relatively high precision that is suitable for performing passive optical alignment.

The photonic component 250 is disposed on a substrate 260. More specifically, a surface 275 of a substrate 262 of the photonic component 250 is connected with the substrate 260 via any suitable means known to a person of ordinary skill in the art (e.g., bonding or adhering). In some embodiments, the substrate 262 comprises a silicon substrate, although other suitable semiconductor materials are also possible. One or more optical waveguides 255 are formed in the substrate 262 and are configured to propagate optical signals. In some embodiments, the substrate 260 provides a reference surface, such that the one or more optical waveguides 255 have a predefined positioning along the Y-dimension (e.g., a height) when the photonic component 250 is connected with the substrate 260.

The assembly 235 may also be connected with the substrate 260 via any suitable means known to a person of ordinary skill in the art, such as application of adhesive. The connection of the assembly 235 with the substrate 260 may assist optical alignment with the one or more optical waveguides 255. In some embodiments, the substrate 260 may comprise a raised portion 295 relative to the portion at which the photonic component 250 is connected. The raised portion 295 is connected with a surface 265 of the assembly 235. As shown, the raised portion 295 has a height in the Y-dimension, such that when a surface 265 of the assembly 235 is connected with the raised portion 295, the core 215 and/or the optical fiber stub 220 of the assembly 235 has a predefined positioning along the Y-dimension.

The photonic component 250 further comprises a cylindrical lens 245, which represents one example of the second cylindrical lens 115. The cylindrical lens 245 is configured to receive the expanded optical signal 285 at a substantially cylindrical surface, and to output a condensed optical signal 290. In some embodiment, the cylindrical lens 245 is optically coupled with the one or more waveguides 255 such that the condensed optical signal 290 is received by the one or more waveguides 255.

In some embodiments, the cylindrical lens 245 is formed in a facet of the substrate 262. For example, the cylindrical lens 245 may be defined from the substrate 262 using a lithographically-defined etching such as deep reactive-ion etching (DRIE). In alternate implementations, the cylindrical lens 245 may be a separate component that is connected with the substrate 262.

In one non-limiting example, a Z-dimension spacing $d_1$ between the substantially cylindrical surface of the optical fiber stub 220 and the substantially cylindrical surface of the cylindrical lens 245 is approximately 40 micrometers (μm), and a Z-dimension width $d_2$ of the cylindrical lens 245 is approximately 80 μm. In such an example, the peak optical coupling between the optical fiber stub 220 and the cylindrical lens 245 is about 1.8 dB, which offers performance reasonably close (e.g., about 1.0 dB less) to passive butt coupling and active lens alignment techniques but with appreciably reduced costs.

In some embodiments, the cylindrical lens 245 may have a cross-section curve in the X-Z plane according to Equation (1):

$$Z' = \frac{cx'^2}{1 + \sqrt{1 - (1+k)c^2 x'^2}} \quad (1)$$

where k represents a conic constant and c represents an inverse of a radius of curvature (R) of the cylindrical lens 245. In one non-limiting example, k=−2.738 and R=−20.1 μm, corresponding to a clear aperture of approximately 125 μm.

Although the optical signal is shown as propagating in one direction (i.e., from the assembly 235 to the photonic component 250), the configuration illustrated in diagram 200 may be configured to propagate the optical signal in the other direction (i.e., from the photonic component 250 to the assembly 235).

Figure 3:
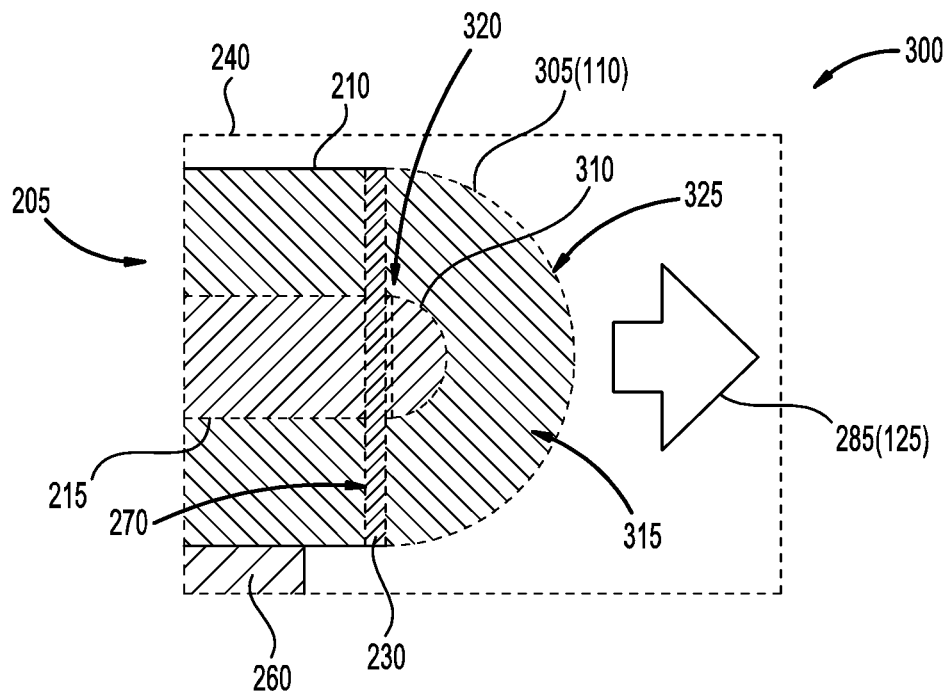
FIG. 3 is a diagram illustrating an exemplary optical coupling using a D-shaped fiber stub as a cylindrical lens, according to one or more embodiments.

FIG. 3 is a diagram 300 illustrating an exemplary optical coupling using a D-shaped fiber stub 305 as a cylindrical lens, according to one or more embodiments. The implementation illustrated in diagram 300 represents one alternate implementation of the section 240 depicted in FIG. 2.

The D-shaped fiber stub 305 comprises a core 310 and cladding 315. In some embodiments, the D-shaped fiber stub 305 comprises a substantially flat surface 320, and the substantially flat surface 320 may be coupled with the facet 270 of the optical fiber 205 via an adhesive 230. In some embodiments, the D-shaped fiber stub 305 has a radius of curvature selected to provide a desired optical coupling.

Although the D-shaped fiber stub 305 is shown as being substantially semicircular, the D-shaped fiber stub 305 may have any alternate shape that provides a substantially cylindrical surface 325 that is suitable for expanding and/or condensing optical signals. Further, although the core 310 is shown as having a D-shape, alternate implementations of the core 310 may have any suitable alternate shape, such as a circular core that is offset from the substantially flat surface 320.

In one non-limiting example, a Z-dimension spacing $d_1$ between the substantially cylindrical surface of the optical fiber stub 220 and the substantially cylindrical surface of the cylindrical lens 245 is approximately 40 micrometers (μm), and a Z-dimension width $d_2$ of the cylindrical lens 245 is approximately 60 μm. In such an example, the peak optical coupling between the optical fiber stub 220 and the cylindrical lens 245 is about 1.0 dB, which offers performance comparable to passive butt coupling and active lens alignment techniques but with appreciably reduced costs.

Figure 4:
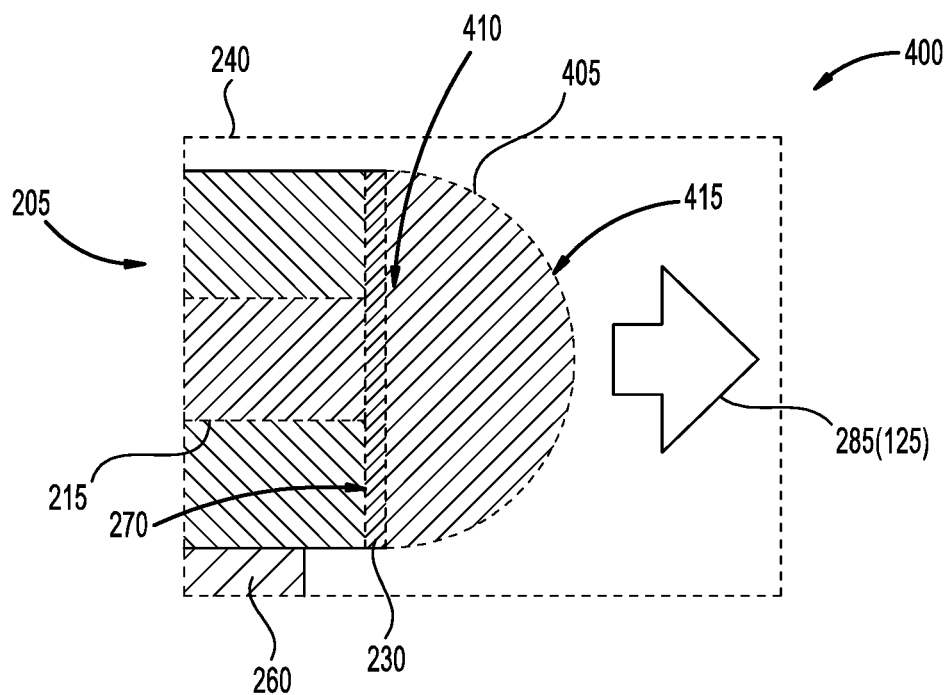
FIG. 4 is a diagram illustrating an exemplary optical coupling using a plastic lens as a cylindrical lens, according to one or more embodiments.

FIG. 4 is a diagram 400 illustrating an exemplary optical coupling using a plastic lens 405 as a cylindrical lens, according to one or more embodiments. The implementation illustrated in diagram 400 represents one alternate implementation of the section 240 depicted in FIG. 2.

In some embodiments, the plastic lens 405 comprises a substantially flat surface 410, and the substantially flat surface 410 may be coupled with the facet 270 of the optical fiber 205 via an adhesive 230. In some embodiments, the plastic lens 405 has a radius of curvature and/or other properties selected to provide a desired optical coupling. For example, the plastic lens 405 may have a same or nearly a same optical index as the core 215 to reduce losses from reflection. The plastic lens 405 may have any shape that is suitable for focusing optical signals. In one non-limiting example, the plastic lens 405 may have a profile matching that of the D-shaped fiber stub 305 (of FIG. 3). In another non-limiting example, the plastic lens 405 may have a cross section curve calculated according to Equation (1) above. Beneficially, the use of the plastic lens 405 allows the shape to be tailored for a particular application to provide an improved coupling efficiency.

Although the plastic lens 405 is shown as being substantially semicircular, the plastic lens 405 may have any alternate shape that provides a substantially cylindrical surface 415 that is suitable for expanding and/or condensing optical signals.

Figure 5A:
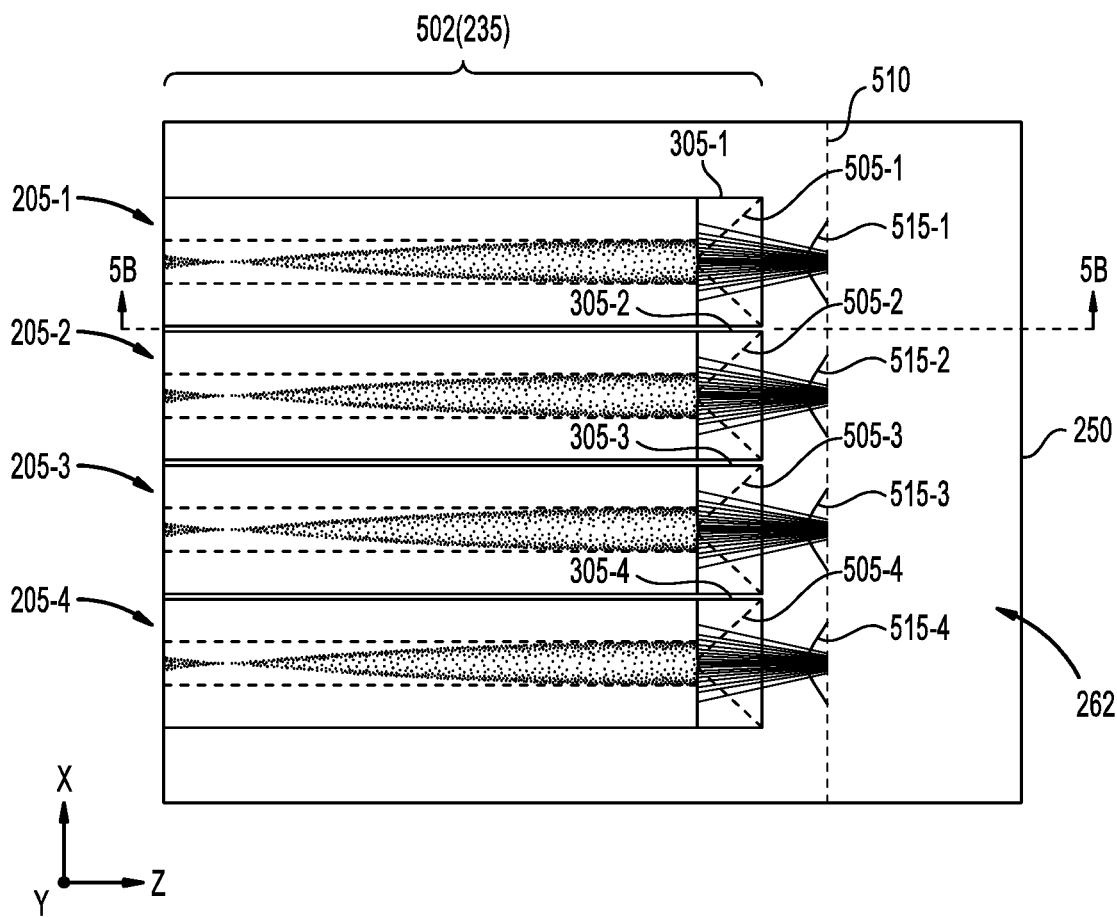
FIGS. 5A and 5B are views of an exemplary optical coupling of an optical fiber array with a photonic component, according to one or more embodiments.
Figure 5B:
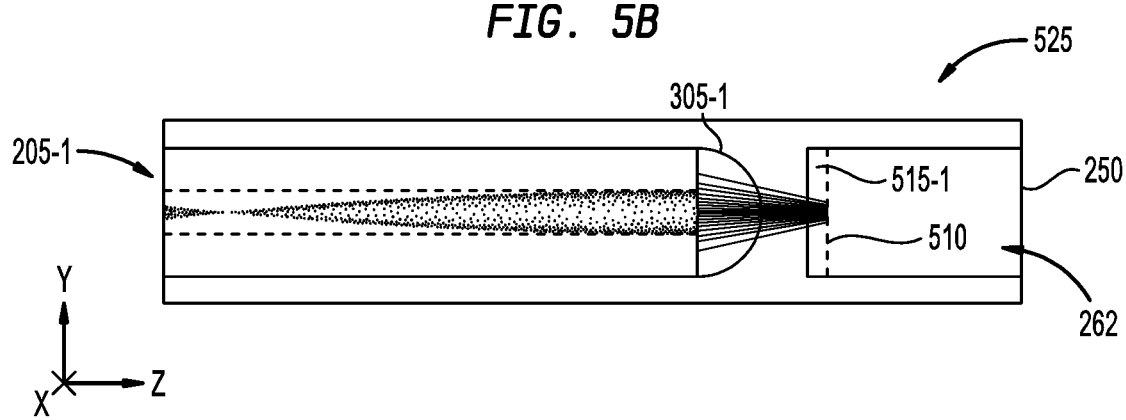

FIGS. 5A and 5B are views 500, 525 of an exemplary optical coupling of an optical fiber array 502 with a photonic component 250, according to one or more embodiments. The optical coupling depicted in the views 500, 525 may be used in conjunction with other embodiments described herein. The optical fiber array 502 represents one possible implementation of the assembly 235 of FIG. 2.

In views 500, 525, the optical fiber array 502 comprises a plurality of optical fibers 205-1, 205-2, 205-3, 205-4 that are connected with a plurality of D-shaped fiber stubs 305-1, 305-2, 305-3, 305-4, as discussed above with respect to FIGS. 2 and 3. The plurality of optical fibers 205-1, 205-2, 205-3, 205-4 may be fixedly connected with each other (and have a predefined positioning relative to each other) according to any suitable techniques known to a person of ordinary skill in the art. For example, a fiber array connector comprising alignment grooves or other features may be used to provide the predefined positioning to the plurality of optical fibers 205-1, 205-2, 205-3, 205-4. The plurality of optical fibers 205-1, 205-2, 205-3, 205-4 may further have an adhesive applied to maintain the predefined positioning.

The plurality of D-shaped fiber stubs 305-1, 305-2, 305-3, 305-4 may correspond to a plurality of substantially cylindrical surfaces 505-1, 505-2, 505-3, 505-4. The plurality of D-shaped fiber stubs 305-1, 305-2, 305-3, 305-4 may be optically coupled with a plurality of cylindrical lenses 515-1, 515-2, 515-3, 515-4 formed into a facet 510 of the substrate 262. In some embodiments, each of the substantially cylindrical surfaces 505-1, 505-2, 505-3, 505-4 is orthogonal to a respective one of the plurality of cylindrical lenses 515-1, 515-2, 515-3, 515-4.

Although the plurality of D-shaped fiber stubs 305-1, 305-2, 305-3, 305-4 are shown in a 1:1 ratio with the plurality of optical fibers 205-1, 205-2, 205-3, 205-4, alternate implementations may include a D-shaped fiber stub connected with multiple optical fibers.

FIG. 6 is an exemplary method 600 of optically coupling with one or more optical fibers using a plurality of cylindrical lenses, according to one or more embodiments. The method 600 may be used in conjunction with other embodiments, such as producing the arrangements depicted in FIG. 2 or FIG. 5. In some embodiments, the method 600 is performed using manufacturing equipment that is known by the person of ordinary skill in the art for manufacturing optical assemblies, such as a positioning device, a polishing device, an adhesive application device, an adhesive curing device, and so forth.

The method begins at the optional block 605, where the manufacturing equipment (e.g., a positioning device) arranges a plurality of optical fibers in a substantially linear arrangement. At the optional block 615, the manufacturing equipment (e.g., a polishing device) processes one or more optical fibers to form a substantially flat facet. In some embodiments, the one or more optical fibers comprise the plurality of optical fibers arranged in the substantially linear arrangement.

At block 625, the manufacturing equipment (e.g., a positioning device, an adhesive application device, and an adhesive curing device) fixedly connects a first cylindrical element with one or more optical fibers to produce an assembly. The one or more optical fibers are configured to propagate one or more optical signals, and the first cylindrical lens element is configured to expand the one or more optical signals along a predefined dimension.

At block 635, the manufacturing equipment (e.g., a positioning device) arranges the assembly such that a second cylindrical lens element is optically coupled with the first cylindrical lens. The second cylindrical lens element is configured to condense the expanded one or more optical signals along the predefined dimension. Method 600 ends following completion of block 635.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
   one or more optical fibers configured to propagate one or more optical signals;
   at least a first cylindrical lens element fixedly connected with the one or more optical fibers and configured to expand the one or more optical signals along a predefined dimension;
   at least a second cylindrical lens element optically coupled with the first cylindrical lens element and configured to condense the expanded one or more optical signals along the predefined dimension; and
   one or more optical waveguides optically coupled with the second cylindrical lens element and configured to receive the condensed one or more optical signals,
   wherein the one or more optical waveguides are formed in a first substrate, and
   wherein the second cylindrical lens element is formed in a facet of the first substrate.

2. The system of claim 1, wherein the one or more optical fibers extend along a first axis, and
   wherein the second cylindrical lens element extends along a second axis that is substantially orthogonal to the first axis.

3. The system of claim 2, wherein the first cylindrical lens element comprises an optical fiber stub.

4. The system of claim 2, wherein the first cylindrical lens element comprises a D-shaped fiber stub.

5. The system of claim 2, wherein the first cylindrical lens element comprises a plastic lens.

6. The system of claim 2, wherein the one or more optical fibers comprise a plurality of optical fibers in a substantially linear arrangement along the second axis.

7. A method comprising:
   fixedly connecting at least a first cylindrical lens element with one or more optical fibers to produce an assembly, wherein the one or more optical fibers are configured to propagate one or more optical signals, wherein the first cylindrical lens element is configured to expand the one or more optical signals along a predefined dimension; and
   arranging the assembly relative to a substrate such that at least a second cylindrical lens element formed in a facet of the substrate is optically coupled with the first cylindrical lens element, wherein the second cylindrical lens element is configured to condense the expanded one or more optical signals along the predefined dimension, wherein one or more optical waveguides are formed in the substrate and configured to receive the condensed one or more optical signals.

8. The method of claim 7, wherein the one or more optical fibers extend along a first axis, and wherein the second cylindrical lens element extends along a second axis that is substantially orthogonal to the first axis.

9. The method of claim 8, wherein the first cylindrical lens element comprises an optical fiber stub.

10. The method of claim 8, wherein the first cylindrical lens element comprises a D-shaped fiber stub.

11. The method of claim 8, wherein the first cylindrical lens element comprises a plastic lens.

12. The method of claim 8, wherein the one or more optical fibers comprise a plurality of optical fibers, the method further comprising:

arranging the plurality of optical fibers in a substantially linear arrangement along the second axis.

13. The method of claim 7, wherein fixedly connecting the first cylindrical lens element with the one or more optical fibers comprises:

applying an index-matching epoxy.

14. The method of claim 7, further comprising:

processing the one or more optical fibers to form a substantially flat facet, wherein the first cylindrical lens element is fixedly connected with the one or more optical fibers at the substantially flat facet.

15. An assembly comprising:

a plurality of optical fibers each extending along a respective first axis and configured to propagate a respective optical signal, wherein the plurality of optical fibers are arranged in a substantially linear arrangement along a second axis that is substantially perpendicular to the respective first axes; and a single cylindrical lens element fixedly connected with a facet of the plurality of optical fibers and configured to expand the respective optical signals along a predefined dimension.

16. The assembly of claim 15, wherein the cylindrical lens comprises one of an optical fiber stub, a D-shaped fiber stub, and a plastic lens.

17. The assembly of claim 15, wherein the cylindrical lens element extends parallel to the second axis.

18. The system of claim 6, wherein the first cylindrical lens element comprising a single cylindrical lens element fixedly connected with a facet of the plurality of optical fibers.

19. The system of claim 1, further comprising:

a second substrate defining a first reference surface, wherein the first substrate contacts the first reference surface to arrange the one or more optical waveguides with a first height relative to the first reference surface, and wherein the first cylindrical lens and the one or more optical fibers are arranged relative to the first reference surface.

20. The system of claim 1, wherein the second substrate comprises a raised portion defining a second reference surface, and wherein the one or more optical fibers contact the second reference surface to arrange the one or more optical fibers relative to the first reference surface.

\* \* \* \* \*